No. 780,150. PATENTED JAN. 17, 1905.
W. H. BERKHEISER.
TURNING LATHE.
APPLICATION FILED DEC. 29, 1903.

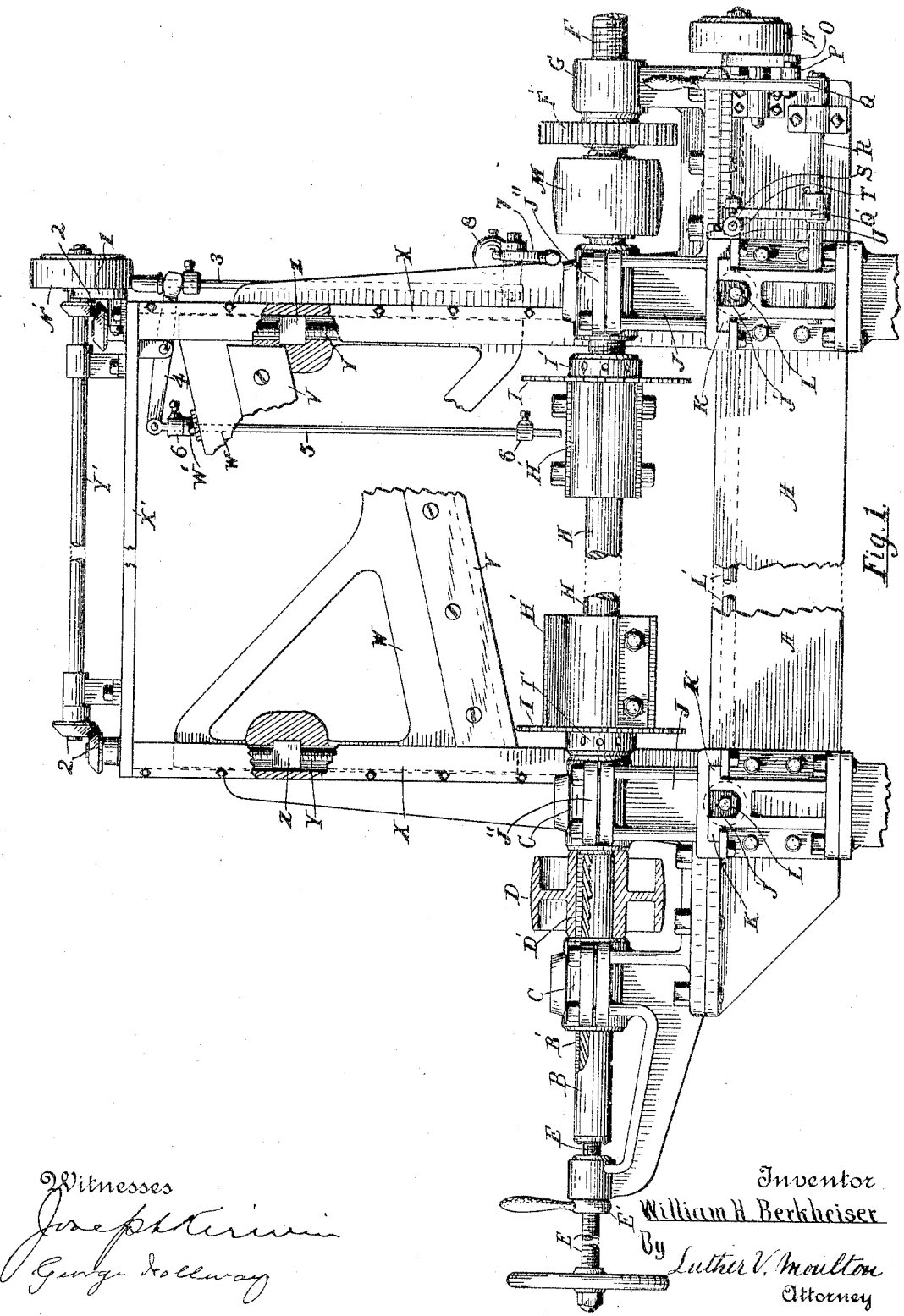

3 SHEETS—SHEET 2.

Witnesses
Joseph Kerwin
George Holloway

Inventor
William H. Berkheiser
By Luther V. Moulton
Attorney

No. 780,150. PATENTED JAN. 17, 1905.
W. H. BERKHEISER.
TURNING LATHE.
APPLICATION FILED DEC. 29, 1903.

3 SHEETS—SHEET 3.

Witnesses
Joseph Kirwin
George Holloway

Inventor
William H. Berkheiser
By Luther V. Moulton
Attorney

No. 780,150.

Patented January 17, 1905.

UNITED STATES PATENT OFFICE.

WILLIAM H. BERKHEISER, OF BENTON HARBOR, MICHIGAN, ASSIGNOR OF ONE-HALF TO WILLIAM A. KNISEL, OF BENTON HARBOR, MICHIGAN.

TURNING-LATHE.

SPECIFICATION forming part of Letters Patent No. 780,150, dated January 17, 1905.

Application filed December 29, 1903. Serial No. 186,973.

*To all whom it may concern:*

Be it known that I, WILLIAM H. BERKHEISER, a citizen of the United States, residing at Benton Harbor, in the county of Berrien and State of Michigan, have invented certain new and useful Improvements in Turning-Lathes; and I do hereby declare the following to be a full, clear, and exact description of the invention, such as will enable others skilled in the art to which it appertains to make and use the same.

My invention relates to improvements in turning-lathes, and more particularly to a semi-automatic lathe for turning columns, newel-posts, and other like large work or for turning work where it is desirable to turn out a considerable number of specimens substantially alike and of uniform size and shape; and its object is to provide the same with means for turning such work rapidly and uniformly without the necessity of employing skilled workmen, to provide improved manually-operated means for controlling the movement of the carriages that support the cutters, and to provide the device with various new and useful features hereinafter more fully described, and particularly pointed out in the claims.

My invention consists, essentially, of a suitable lathe embodying a driving-spindle and dead-center both adjustable in the direction of their axes, together with a roughing-cutter mounted on a suitable shaft journaled in bearings supported upon a suitable carriage or carriages and means for moving the same toward and from the axis of the stock, a finishing-cutter adapted to impart the finished form to the work, means for moving said finishing-cutter, means for operating the roughing-cutter, manually-operated means for controlling the movement of the carriages, and stop mechanisms for limiting the movements of the carriages supporting the cutters, as will more fully appear by reference to the accompanying drawings, in which—

Figure 5:
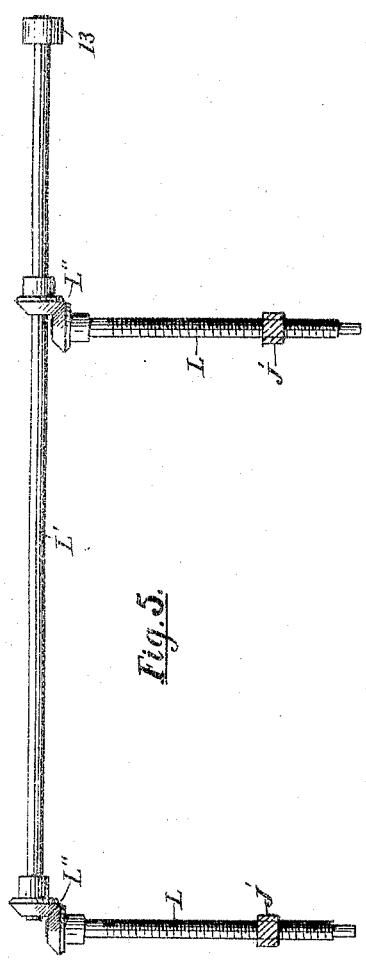
Figure 2:
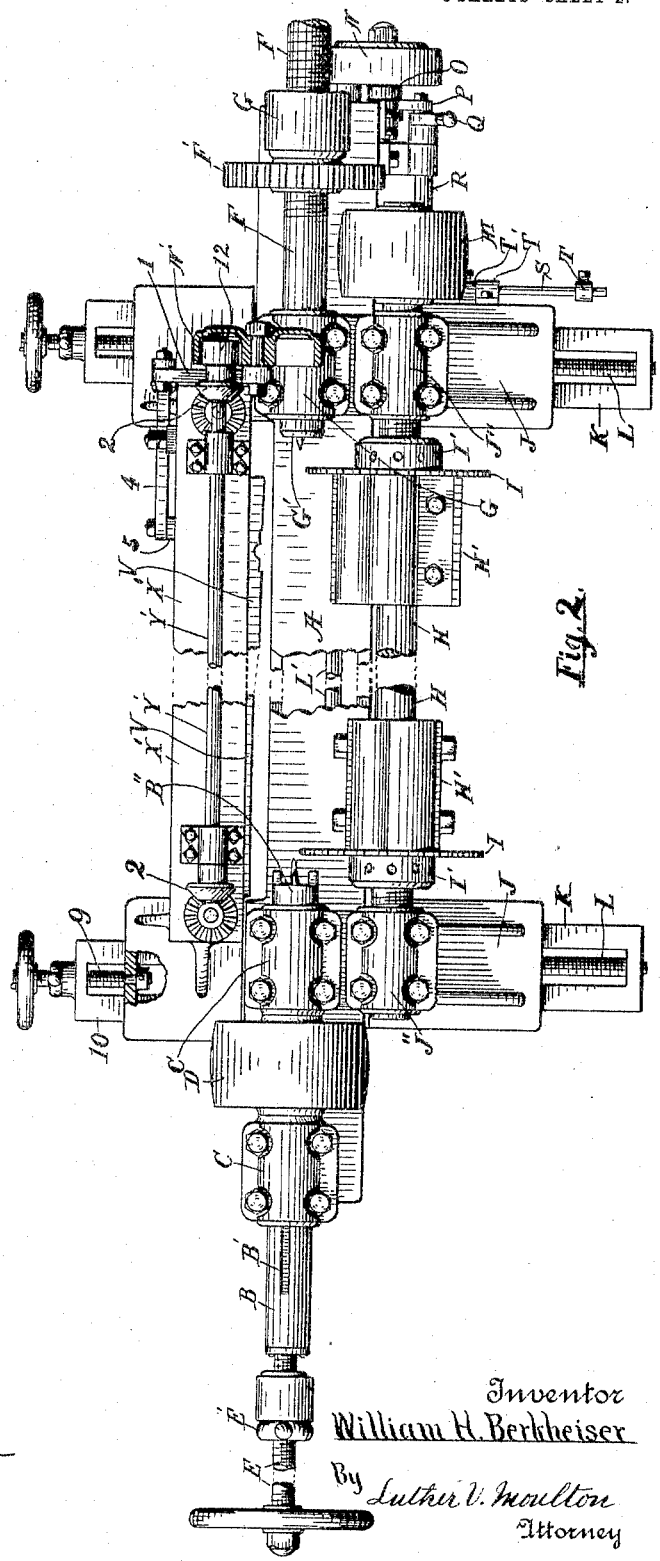
Figure 3:
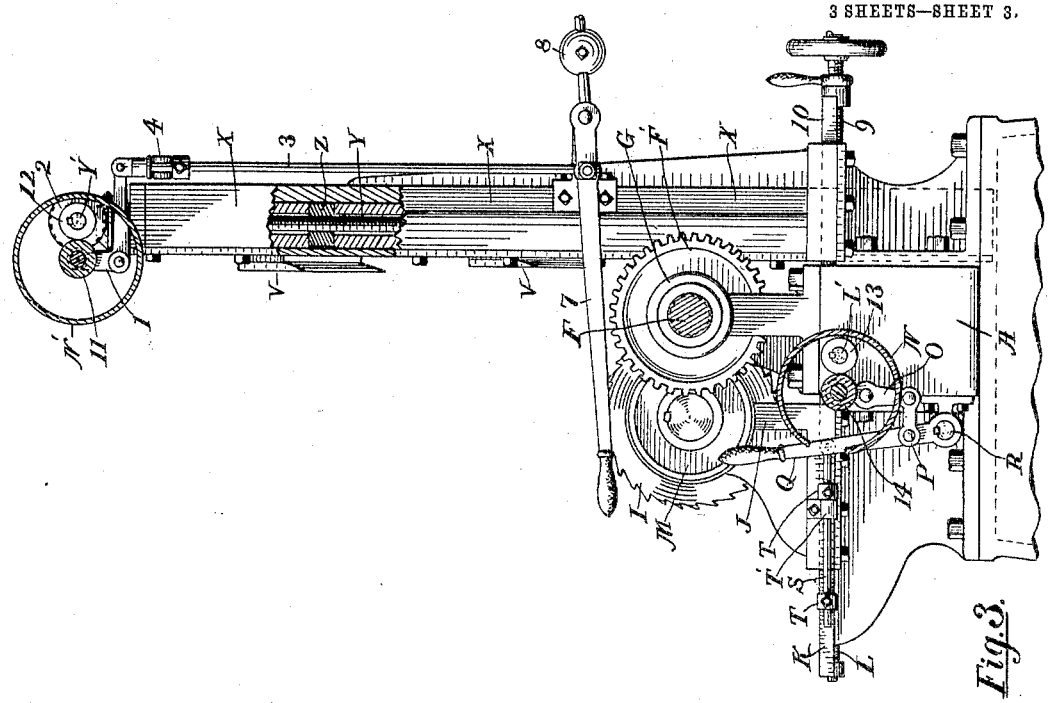
Figure 4:
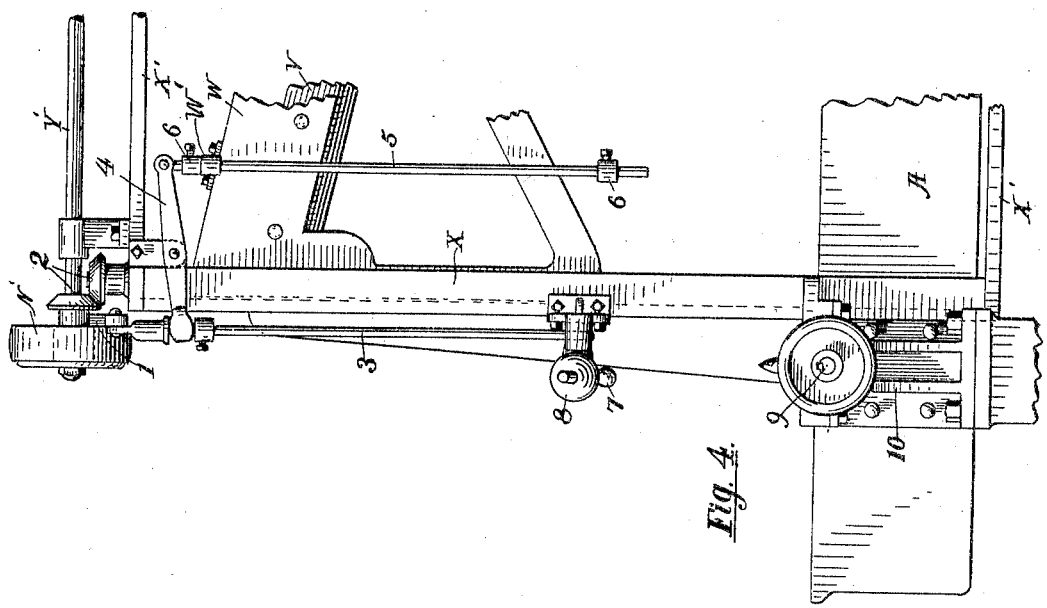

Figure 1 is a front elevation of a device embodying my invention with the middle part broken away to shorten the drawing; Fig. 2, a plan view of the same; Fig. 3, an end elevation of the same; Fig. 4, a partial rear elevation of the same, and Fig. 5 a detail plan of the operating mechanism for the carriages of the roughing-cutters.

Like characters refer to like parts in all of the figures.

A represents the bed of the lathe.

B is the driving-spindle, mounted in suitable bearings C and longitudinally adjustable therein by means of a suitable screw E, connected to the spindle and provided with a lock-nut E'. Said spindle is provided with a keyway B', in which is a sliding key D', connecting the driving-pulley D with the spindle B.

F is the tail-screw of the lathe, adapted to adjust the dead-center G' toward and away from the driving-spindle, and F' a suitable gear on the said screw to rotate the same and operated by any convenient means. (Not shown.) G represents the bearings for the said screw F and dead-center G'.

H is a suitable shaft on which is mounted a series of roughing-cutters H', adapted to cut away and roughly form the surface of the stock. On this shaft is also mounted cut-off saws I, adapted to cut the ends of the work and to sufficiently sever the same to form the finished ends when the center is bored out later on. These roughing-cutters and saws are suitably held in place by adjustable collars I' on the shaft H. This shaft is journaled in suitable bearings J'', mounted on carriages J, movable upon ways K, extending at right angles to the bed A. These carriages are simultaneously moved upon the ways by means of screws L, one to each carriage, which screws engage nuts J' on the carriages and are simultaneously rotated by a shaft L', connected to each screw by bevel-gears L''. This shaft L' is provided with a pulley 13, which pulley is engaged by an internal friction-pulley N at one side and by a small external friction-pulley 14, forming the hub of the pulley N. The said pulleys N and 14 are movable by being mounted on a pivoted lever O, operated by a manually-operated lever Q, connected to the same by a rod P, whereby either the internal friction N or the small friction 14 may alternately be engaged with the pulley 13 by shifting said levers on their pivots, or by throwing the levers to mid-position both pulleys are disconnected from the pulley 13 and the shaft L' will remain at rest. The lever Q is rigidly mounted on a rock-shaft R, to which shaft is rigidly attached a second lever Q', to which latter lever is pivotally attached a rod S, which rod is slidable in the opening of an eye T', attached to one of the carriages J. On this rod S are adjustable set-collars T, which are engaged by the eye T', and thus the rod S is moved longitudinally to operate the lever Q, and thus release the friction and stop the movement of the carriages at the respective outer and inner limit of their movement, so that the operator cannot run the carriages beyond certain predetermined positions.

At the opposite side of the lathe from the described roughing-cutter is a finishing-cutter V, consisting of a suitable vertically-movable knife having in its front side the desired contour of the finished work in reverse and presenting its cutting edge at an inclination to the axis of the lathe, whereby a shearing cut is secured and the knife brought into action at successive portions from its lower to its upper end as it descends. This cutter is movable in a vertical plane tangential to the circumference of the finished work and for this purpose is mounted on a carriage W, slidable in suitable vertical ways X, connected at top and bottom by suitable beams X', and these ways are mounted on rearwardly-projecting horizontal ways 10, as shown in Fig. 4, whereby the said ways X, together with the finishing-cutter, may be adjusted toward and from the axis of the lathe by suitable screws 9, journaled in the ways 10 and connected to the vertical ways X. To move the carriage W in these ways, screws Y extend vertically within the ways and in suitable recesses in the carriage W are inserted nuts Z, with which the screws engage. These screws are rotated by a shaft Y', mounted in suitable bearings and connected to the screws by bevel-gears 2. This shaft Y' is provided with a friction-pulley 12, engaged by an internal friction-pulley N' at one side and an external friction-pulley 11 at the other side and arranged in the axis of the pulley N', said pulleys N' and 11 being movably supported upon a bell-crank lever 1, which lever is adjusted on its pivot to alternately engage the said friction-pulleys N' and 11 with the pulley 12 by means of a rod 3, connected to the horizontal arms of the lever and thence extended downward and connected to a hand-lever 7, provided with a counterbalance-weight 8, whereby when the hand-lever is released the weight will throw the internal friction into contact with the pulley 12, and thus automatically run the carriage W upward. To limit the movement of this carriage W, a lever 4 is connected to the rod 3 at one end and intermediately pivoted to a suitable support, and to the other end of this lever is connected a rod 5, extending downward near the carriage W, upon which carriage is mounted an eye W', adapted to traverse this rod, and on the rod are set-collars 6, engaged by the eye, whereby the lever 4 is operated to move the rod 3 and disengage the friction, and thus stop the rotation of the shaft Y' and screws Y.

The various pulleys—D for rotating the work, M for rotating the roughing-cutters, N for moving the carriages of the roughing-cutters, and N' for moving the carriage W—are each engaged and rotated by suitable belts. (Not shown.)

In operation the carriages J are run outward sufficiently to permit insertion of the stock in the lathe and the carriage W is run upward in like manner. The driving-spindle B and dead-center G' are then adjusted by screws E and F to engage the stock and locate the same relative to the saws I. The pulley 14 is then engaged with the pulley 13, which moves the carriage J slowly toward the lathe, and the saws I and cutters H' engage and operate upon the work to cut it to length and roughly form the exterior of the same. The eye T' will contact one of the collars T when the carriages J have advanced sufficiently to complete the work of roughing cutters and saws, and the carriages will thus be automatically stopped. By shifting the lever Q the carriages can be returned to be automatically stopped by the outer set-collar T. By depressing the lever 7 the pulley 11 will contact the pulley 12, and the rotation of the shaft Y' will cause the finishing-cutter V' to descend, and as it moves slowly downward it will successively engage the work with a shearing cut beginning at the lower or left-hand end, and thus finish the work to shape, being automatically stopped in its descent by the lower collar 6 on the rod 5. The lever 7 being then released, the weight 8 will operate to restore the finishing-cutter V to its elevated position. It will thus be seen that this machine is well adapted to produce work of substantially uniform dimensions and shape with certainty and rapidity and without the necessity of employing a skilled workman, as in hand-turning. The device is thus well adapted for producing what are known as "colonial" columns, newel-posts, spindles for railing, and various like turned work.

Having thus fully described my invention, what I claim, and desire to secure by Letters Patent, is—

1. In a lathe, in combination with means for rotating the work and a roughing-cutter, a movable carriage, a finishing-cutter on the carriage, screws to move the carriage, a shaft to operate the screws, a pulley on the shaft, inner and outer friction-pulleys engaging opposite sides of said pulley, a bell-crank lever movably supporting said friction-pulleys, a hand-lever and a weight connected to the bell-crank lever to operate the same, a rod also connected to said lever to operate the same, an eye on the carriage and slidable on the rod, and set-collars on the rod and engaged by the eye.

2. In a lathe, in combination with means for rotating the stock, and a roughing-cutter, a finishing-cutter movable in a plane tangential to the surface of the finished work, a carriage supporting the cutter, screws to move the carriage, a shaft to operate the screws, a pulley on the shaft, friction-pulleys engaging opposite sides of the pulley on the shaft, a pivoted lever movably supporting the friction-pulleys, a hand-lever, a rod connecting the hand-lever and the pivoted lever, and a counterweight on the hand-lever.

3. In a lathe, in combination with carriages supporting a rotary shaft and cutters, screws to move the carriages, a shaft and bevel-gears to operate the screws, a friction-pulley on the end of the shaft, inner and outer friction-pulleys alternately engaging the respective sides of the pulley on the shaft, a pivoted lever movably supporting the inner and outer friction-pulleys, a manually-operated pivoted lever, a rod pivotally connecting said levers, a rod connected to the manually-operated lever, an eye on one of the carriages and slidably supporting the rod, and adjustable set-collars on the rod to engage the eye.

In testimony whereof I affix my signature in presence of two witnesses.

WILLIAM H. BERKHEISER.

Witnesses:
M. J. MERWIN,
C. K. FARMER.